Patented Aug. 20, 1935

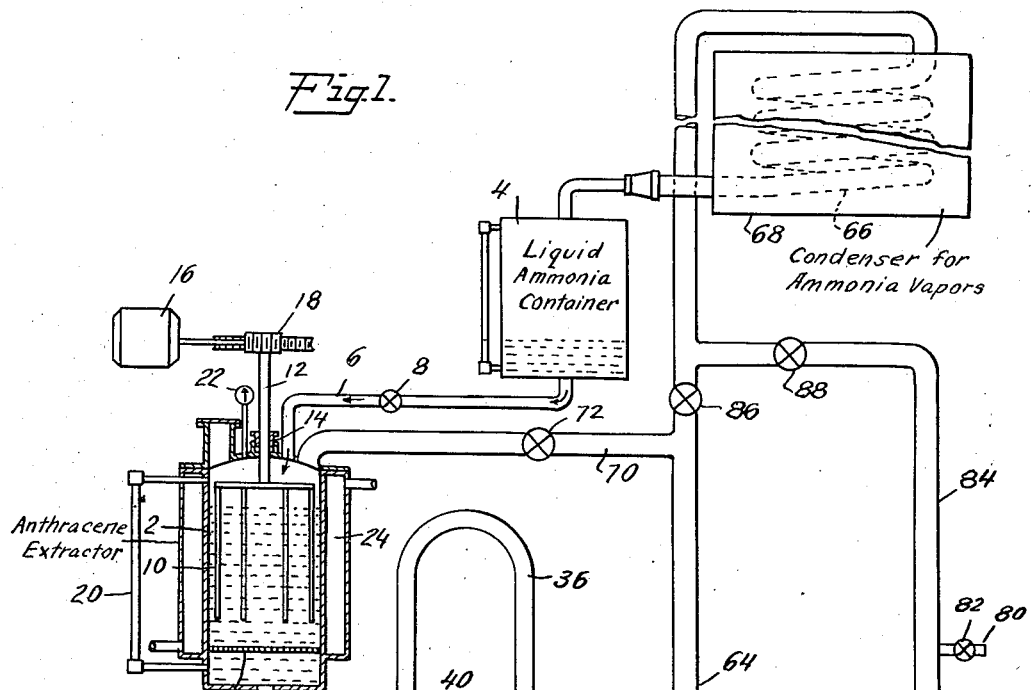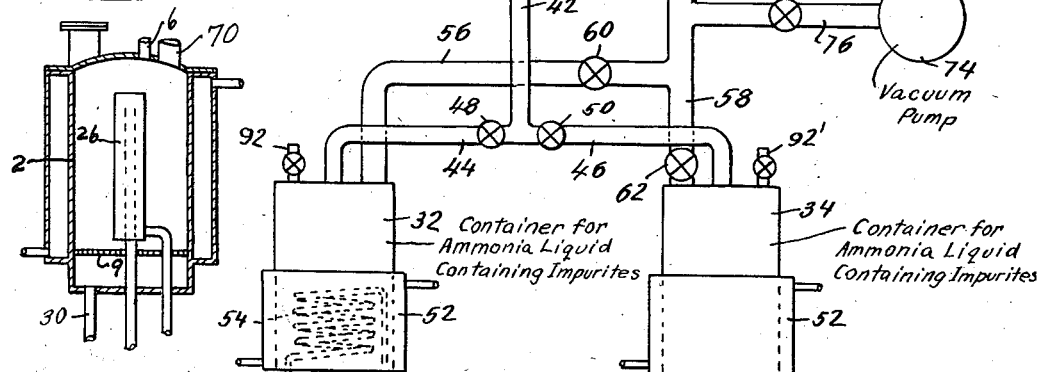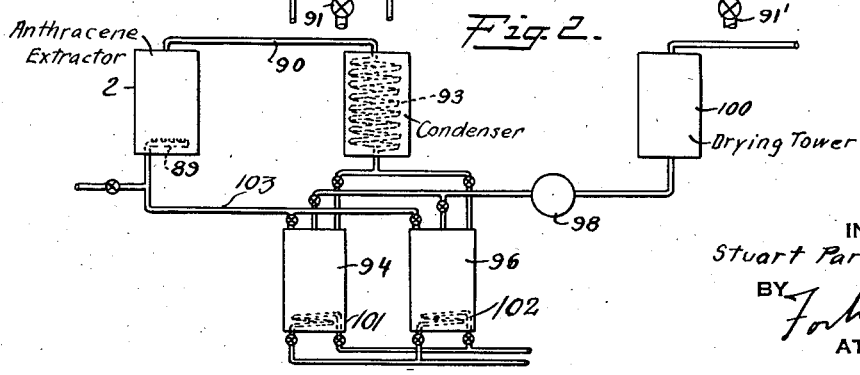

2,011,724

UNITED STATES PATENT OFFICE 2,011,724

PURIFICATION OF ORGANIC SOLIDS

Stuart P. Miller, Englewood, N. J., assignor to The Barrett Company, New York, N. Y., a corporation of New Jersey Application October 28, 1932, Serial No. 639,968

5 Claims. (Cl. 260—163)

My invention relates to the purification or treatment of materials and particularly to the purification of materials by the selective action of a solvent which is normally gaseous, or has a high vapor tension at ordinary temperatures.

My invention is adapted for use, in general, for treating or purifying materials, but is particularly adapted for the purification of crude anthracene. Crude anthracene, such as that derived by filtering the crystals from the anthracene oil obtained in the distillation of coal tar, usually contains only about 25 to 40 per cent of anthracene, the remainder being impurities, such as phenanthrene, carbazol and the like. These impurities can be extracted from crude anthracene by the action of a solvent which selectively dissolves the impurities in the crude anthracene but which has relatively little solvent action upon anthracene itself.

It has been proposed heretofore to purify anthracene by the action of liquid anhydrous ammonia. However, in carrying out the process it has not been possible to remove the ammonia completely from the extracted material and from the apparatus in which the process is practiced. This has resulted in substantial loss of ammonia and consequent increase in cost of the purification, and has had the further disadvantage that on removal of the extracted anthracene from the apparatus, large amounts of ammonia gas are evolved, making the operation difficult to carry out. Residual ammonia will be evolved from the extracted anthracene, making its handling and storage difficult.

I have discovered that substantially pure, dry anthracene of high commercial value can be obtained without the loss of ammonia and without the attendant nuisance of strong ammonia fumes by extracting crude anthracene with liquid ammonia in a closed system and thereafter treating the purified anthracene to remove ammonia adhering thereto prior to exposing the purified anthracene to the atmosphere. Substantially pure anthracene, free from ammonia, is thus obtained and ammonia removed from the anthracene is recovered for re-use in the process.

Among the objects of my invention are to provide a new and improved method of purifying materials, such as anthracene, whereby a substantially pure, dry commercially valuable product is obtained; to recover and conserve solvent used in the process; to separate and recover impurities removed from anthracene or the like by the solvent; and to provide simple and improved apparatus for carrying out the process. These and other objects and features of my invention will appear from the following description thereof in which reference is made to the accompanying figures of the drawing, in which—

Fig. 1 illustrates a preferred type of apparatus for practicing my process, and

Figs. 2 and 3 illustrate diagrammatically modifications of a portion of the apparatus illustrated in Fig. 1.

This invention is not only applicable to the purification of anthracene by extraction with liquid ammonia, but to purification of anthracene and other organic solids, for example fluorene, by extraction with other extracting media, such for example as sulphur dioxide, aqua ammonia containing at least 75 per cent ammonia in solution, methyl and ethyl ethers ($CH_3OCH_3$ and $C_2H_5OC_2H_5$), acetone ($CH_3COCH_3$), and the like. For example, crude anthracene may be purified in accordance with this invention by extraction with acetone instead of with ammonia as described below, higher temperatures or lower pressures, or both, being employed as required by the higher boiling point acetone. Acetone has a boiling point of 56.5° C. and a melting point of —94.6° C. Its vapor pressure at 20° C. is 180 mm. of mercury; at 40° C., 440 mm. of mercury; at 56.5° C., 760 mm. of mercury; at 60° C., 860 mm. of mercury; and at 80° C., 1611 mm. of mercury. Using acetone as the extracting medium, it is preferred to maintain in the extractor a pressure of about atmospheric or somewhat above atmospheric, for example 15 pounds.

In accordance with my invention, crude anthracene containing say 25 to 40 per cent of anthracene, is introduced into an extractor adapted to be placed under sufficient pressure to retain the ammonia in liquid form at normal atmospheric temperature or at the temperature at which the process is carried out. The extractor is then sealed and is preferably evacuated to remove air therefrom. Liquid ammonia from a reservoir is then introduced into the extractor in contact with the anthracene. The solvent action of liquid ammonia on the impurities in anthracene is considerably greater when operating at temperatures in the neighborhood of atmospheric temperature or higher and under superatmospheric pressure than when operating under atmospheric or lower pressures and at very low temperatures. For this reason the extractor is preferably maintained during operation under suitable pressure to insure the maintenance of the ammonia in the extractor in liquid form at the desired temperature of extraction, e. g., 25° to 50° C. When operating under normal atmospheric temperatures this pressure will ordinarily be about 100 pounds per square inch or somewhat higher, e. g., 125 pounds per square inch.

The liquid ammonia may be introduced either continuously or intermittently into the extractor in contact with the crude anthracene allowing the ammonia to collect therein until the liquid has reached a predetermined level. When operating intermittently the ammonia collects in the extractor until the anthracene is completely immersed therein. Thereafter the liquid ammonia containing impurities is then discharged from the extractor by means of a siphon or otherwise. Complete immersion of the anthacene in the liquid ammonia insures thorough contact of all particles of anthracene with the liquid ammonia and substantially complete extraction of soluble impurities therefrom. Channeling through the solid material, which would be occasioned by the continuous passage of liquid ammonia therethrough, does not occur when operating as herein disclosed. After the discharge of liquid ammonia from the anthracene, additional liquid ammonia may be fed to the anthracene which is again completely immersed, and the ammonia containing impurities withdrawn upon complete immersion of the anthracene. These cycles are repeated several times until the anthracene is purified to the desired extent.

The liquid ammonia and solid anthracene may be agitated in the extractor whereby impurities, such as phenanthrene, carbazol, etc., are more readily dissolved and the resulting solution of the impurities in liquid ammonia is withdrawn from the anthracene. The solution thus obtained is passed to a receptacle wherein the ammonia is distilled to obtain pure ammonia gas, and the ammonia gas is condensed to a liquid and returned to the cycle. Additional liquid ammonia may be used for extracting further impurities from the anthracene and the resulting solution of impurities in liquid ammonia withdrawn from the anthracene and passed to another receptacle while distilling ammonia from the solution first obtained.

After the anthracene has been treated with the solvent to remove the desired amount of impurities therefrom and after the liquid ammonia has been withdrawn from the anthracene, ammonia remaining in contact with the anthracene is expelled therefrom and recovered for reuse in the operation. The removal of ammonia from the anthracene may be effected by heating the anthracene to a sufficient temperature to evaporate the ammonia under the pressure maintained in the system, or if preferred, steam, air or other inert gas may be blown through or over the anthracene to expel ammonia remaining therein. Dry air is preferably employed when it is desired to condense the ammonia and thus remove it from the air leaving the anthracene containing residual ammonia. The ammonia gas thus removed from the anthracene may be condensed or may be absorbed in a suitable material, such as water or sulfuric acid. When steam is employed, the mixture of steam and ammonia may be cooled to condense the major portion of the water, and the ammonia vapors passed through a drier, containing calcium oxide or other suitable drying agent, prior to condensing and reusing the same. The water containing some dissolved ammonia condensed from the mixture of steam and ammonia in the latter operation may be heated to produce steam for further treating the purified anthracene. If preferred, the ammonia remaining in contact with the anthracene may be removed by evacuating the extractor in which the anthracene is contained while heating the anthracene by means of steam or otherwise to aid in the evaporation of the liquid ammonia.

The impurities present in crude anthracene consist largely of phenanthrene, carbazol, and other solid and liquid hydrocarbons. These impurities are characterized by different solubilities in liquid ammonia and this property of the impurities is utilized in my process for effecting separation and recovery thereof. The phenanthrene and other hydrocarbons are more readily soluble in liquid ammonia than is carbazol. Therefore, the liquid ammonia first passed in contact with the crude anthracene contains proportionately more of the phenanthrene and other hydrocarbons than the liquid ammonia subsequently passed in contact with the anthracene. When operating in either a continuous or intermittent cycle, I prefer to separate that portion of the liquid ammonia first withdrawn from the anthracene and thereafter to collect separately that portion of the liquid ammonia subsequently passed in contact with the anthracene whereby a rough separation of the phenanthrene and hydrocarbons from the carbazol is effected. The fractions of the liquid ammonia thus separated may be treated independently for effecting the recovery of constituents of the impurities therefrom. The liquid ammonia thus removed from the anthracene in the initial stages of the process contains the major portion of the phenanthrene and other hydrocarbons and is collected in one or more receivers separate from those in which ammonia containing carbazol and impurities subsequently removed from the anthracene by further extraction thereof is collected.

The ammonia is distilled off or otherwise separated from the impurities in the various receivers, and in order to avoid solidification of the impurities in the receptacle, I prefer to introduce a solvent for the impurities into the receptacles prior to or during distillation of the ammonia so that the impurities are prevented from solidifying or crystallizing out of the solution onto the heating coils and walls of the receptacle. This treatment facilitates the removal of impurities from the receptacles. However, if preferred, solvent for the impurities may be introduced into the receptacles after distillation or separation of the ammonia has been completed, or the impurities may be melted by the application of heat and drawn off in molten form.

In carrying out the process, the anthracene may be given a preliminary treatment with a solvent other than ammonia to reduce the amount of impurities therein prior to subjecting anthracene to treatment with liquid ammonia or other solvent composed of a normally gaseous substance in liquid form. The anthracene treated in accordance with my process is referred to throughout the specification and in the claims as "crude anthracene". However, it is intended that the term "crude anthracene" as used shall include anthracene which has been given a preliminary treatment to remove a portion of the impurities therefrom, as well as anthracene which has not been given any pretreatment.

Crude anthracene containing from 25 to 40 per cent of pure anthracene, when treated in accordance with my process as heretofore described, is purified to a commercially valuable product containing about 80 to 85 per cent of pure anthracene. The purity of the product may be somewhat higher or lower, depending upon the amount of impurities in the crude anthracene treated and the length of time and conditions under which purification of the anthracene is carried out. The product obtained by treating crude anthracene in accordance with my invention may be sublimed to obtain a product of higher purity.

The process as herein described may be carried out in any suitable apparatus, such as that illustrated in Fig. 1 of the drawing wherein the crude anthracene to be treated is introduced into an extractor 2 adapted to receive and contain liquid ammonia from the ammonia reservoir 4 through the pipe 6 controlled by the valve 8. A supporting screen 9, spaced from the bottom of the extractor, supports the solid anthracene and is provided with apertures of sufficient fineness to prevent the anthracene from passing therethrough. The extractor may be provided with a stirring device 10 carried by the shaft 12 extending through a packing 14 in the cover of the extractor and adapted to be rotated by the motor 16 and worm gear 18. A liquid level indicator 20 and pressure gauge 22 are also provided for indicating the level and pressure of the ammonia in the extractor. In order to heat the anthracene to drive off ammonia remaining in contact with the anthracene after purification thereof, the extractor is surrounded by a steam jacket 24 and in addition the extractor may be provided with a centrally located member 26, as shown in Fig. 3, into which steam is passed for aiding in the heating and removal of ammonia from the solid material.

Liquid ammonia containing dissolved impurities is passed from the bottom of the extractor through the pipe 30, of somewhat greater internal diameter than pipe 6, to the receptacles 32 and 34. Only two receptacles for receiving the liquid ammonia and dissolved impurities are shown although it will be understood that any suitable number of receptacles for this purpose may be employed. The pipe 30 is provided with a siphon 36 extending upwardly to a point below the top of the extractor and serving as a means for periodically discharging liquid ammonia and dissolved impurities from the extractor when the apparatus is operated intermittently. However, a by-pass 38, controlled by valve 40, extends across the bottom of the siphon 36 to enable the apparatus to be used for the continuous removal of liquid ammonia and impurities from the extractor, if so desired. The lower portion 42 of the pipe 30 communicates with the receptacles 32 and 34 through the pipes 44 and 46 controlled by valves 48 and 50, respectively. By controlling the operation of the valves 40, 48 and 50, the process may be carried out either continuously or intermittently and liquid ammonia containing dissolved impurities withdrawn from the extractor and passed into either of the receptacles 32 and 34.

The receptacles 32 and 34 are each provided with a steam jacket 52 for heating and distilling the ammonia contained therein to drive off the ammonia and recover the dissolved impurities. The receptacles may also contain steam coils 54 for aiding in the distillation of the ammonia. Ammonia gas produced by distillation of ammonia in the receptacles is removed therefrom through the pipes 56 and 58 controlled by valves 60 and 62 and connected with vapor line 64 leading to the condenser 66 located in the tank 68. Ammonia gas expelled from the purified anthracene in the extractor 2 is also passed to the ammonia return line 64 by means of the pipe 70 controlled by valve 72.

A vacuum pump 74 connected to the vapor line 64 at 75 serves to evacuate the extractor and receptacles prior to the introduction of liquid ammonia into the system. The vacuum pump may also be used for removing ammonia gas from the extractor and receptacles to return the same to other parts of the system. The pipe 76 leading from the vapor line 64 to the vacuum pump 74 is provided with a valve 78 for closing off this portion of the apparatus during the extraction operation. The discharge side of the vacuum pump is provided with an exhaust 80 controlled by valve 82, and is also connected to the line 84 serving to return ammonia gas to the vapor line 64 when using the vacuum pump for removing ammonia from the extractor or the receptacles 32 and 34. A valve 86 is located in the vapor line 64 below condenser 66 and serves to maintain the vacuum in the extractor and the necessary pressure in the condenser and liquid ammonia receiver during the evacuation stage. A valve 88 is also inserted in the line 84 to cut off the vacuum pump when it is not being used. For practical purposes, a multiple stage vacuum pump may be used of any desired and well known type.

In operating the apparatus shown in Fig. 1, crude anthracene to be purified is introduced into the extractor 2. The extractor is closed and valve 72 in pipe 70 and valves 60 and 62 in pipes 56 and 58 leading from the receptacles 32 and 34 respectively are opened. Valve 86 in the vapor line 64 and valve 88 in the pipe 84 are closed. Valve 78 in the pipe 76 leading from the vapor line to the vacuum pump is opened and valve 82 in the exhaust 80 leading to the atmosphere is opened. The vacuum pump 74 is then operated to withdraw air from the extractor and receptacles as well as the piping communicating therewith until substantially all of the air has been removed from the system. Valves 72, 78, and 82 are then closed. Liquid ammonia is discharged from the reservoir 4 into the extractor 2 by opening the valve 8 in the pipe 6 and the stirring device 10 in the extractor is operated to agitate the anthracene and liquid ammonia during operation. As soon as pressure is built up in extractor 2 and receivers 32 and 34, valve 86 is opened to admit vapor to the condenser 68 and heat is applied to one of the receivers 32 and 34. If intermittent discharge of the liquid ammonia containing dissolved impurities from the extractor is desired, the valve 40 in the by-pass 38 is closed and the level of the liquid ammonia in the extractor rises as ammonia continues to flow through the pipe 6, until the level thereof is at or above the top of the siphon 36 in the pipe 30. Ammonia then flows through the siphon 36 and flow thereof continues at a rate greater than the rate of feed through pipe 6 until all or substantially all of the liquid ammonia in the extractor is withdrawn therefrom and the siphon broken. Liquid ammonia continues to collect in the extractor again until the siphon has again been established. In this way intermittent filling and discharge of the extractor is effected. If continuous removal of the liquid ammonia from the extractor is desired, the valve 40 in the by-pass 38 is opened and liquid ammonia is withdrawn continuously from the extractor, preferably at a rate equal to that at which ammonia is introduced into the extractor so as to maintain a continuous supply of liquid ammonia in the extractor while continuously withdrawing liquid ammonia containing impurities therefrom.

When withdrawing liquid ammonia from the extractor either continuously or intermittently, the ammonia containing dissolved impurities passes through the lower portion 42 of the pipe 30 to one of the receptacles 32 and 34. The valves 48 and 50 in the pipes 44 and 46 are adjusted to deliver the liquid ammonia to whichever of the receptacles 32 and 34 it is desired to fill. The operation thus continues until one receptacle is filled or until the major portion of the phenanthrene and other soluble impurities have been extracted from the anthracene. If the liquid ammonia withdrawn from the extractor is being passed to receptacle 32 and the valve 48 is open, the valve 50 in the pipe 46 is closed. Thereafter, when the receptacle 32 is full or the major portion of the phenanthrene and other impurities have been extracted from the anthracene, the valve 48 is closed and valve 50 opened whereby liquid ammonia containing impurities is passed to the receptacle 34.

As liquid ammonia withdrawn from the extractor continues to pass into the receptacle 34, steam is passed into the steam jacket 52 and steam coils 54 of the receptacle 32 so that ammonia is distilled off from the impurities in the receptacle 32. Valve 60 in pipe 56 is kept open and ammonia gas produced by distillation is passed to the vapor line 64. Valve 62 is also kept open during the extraction. In this way the ammonia in one of the receptacles is distilled while liquid ammonia from the extractor is being collected in the other receptacle. The ammonia gas passed to the vapor line 64 flows upwardly to the condenser 66 in which it is cooled and liquefied and returned to the liquid ammonia reservoir 4.

I may introduce into the receptacles 32 and 34 a solvent for the impurities to dissolve the same and prevent crystallization thereof on the walls and heating coils within the chamber as distillation proceeds. The solvent used should be substantially non-volatile under the conditions under which distillation in the receptacles takes place in order to obtain substantially pure ammonia gas as a distillate. The solvent may be a coal tar oil, such as creosote oil, press oil remaining after the removal of naphthalene from a naphthalene fraction, etc. The solvent and dissolved phenanthrene, carbazol, etc., are periodically or continuously removed and fresh solvent introduced. The solutions of impurities in the solvent removed from the receptacles 32 and 34 may then be separately treated to recover phenanthrene and carbazol therefrom. The solutions may be mixed prior to separation of the phenanthrene and carbazol. However, by collecting the ammonia solution withdrawn from the extractor in separate fractions in the manner heretofore described so that liquid ammonia relatively rich in phenanthrene is collected in one receptacle and liquid ammonia relatively rich in carbazol is collected in another receptacle, an initial separation of the phenanthrene and carbazol is effected.

The extraction of the anthracene is continued until the anthracene has been purified and impurities removed therefrom to the desired extent. The valve 8 in the pipe 6 is then closed to cut off the flow of liquid ammonia to the extractor. Ammonia containing impurities is withdrawn from the extractor, the valve 38 being opened (if closed) to permit draining as completely as possible. After draining, valve 38 and valves 48, 50, 60 and 62 are closed. Steam is admitted to the steam jacket 24 and to the centrally located heating element 26 in the extractor whereby ammonia remaining in contact with the purified anthracene is expelled from the anthracene. The ammonia gas is thus distilled off from the purified anthracene and passed through the pipe 70 to the vapor line 64 and recovered for re-use. Subsequently, valve 86 is closed and valves 78 and 88 opened and additional ammonia vapors withdrawn from the extractor and returned to the cycle by means of the vacuum pump 74. The vacuum thus applied to the extractor 2 may also be applied to the receptacles 32 and 34 to aid in the removal of ammonia therefrom if desired by opening valves 60 and 62.

In the modified form of the apparatus illustrated in Fig. 2 of the drawing, the ammonia remaining in contact with the purified anthracene is expelled by passing steam, preferably at 3 to 4 pounds pressure or above into contact with the anthracene to vaporize the ammonia therein. For this purpose steam is introduced into extractor 2 through the steam inlet 89 in the bottom thereof. A mixture comprising steam and ammonia gas passes out through the steam outlet pipe 90 in the top of the extractor, leaving the anthracene in a pure condition. The mixture of steam and ammonia passes to a condenser 93 wherein the greater part of the steam is condensed to water. The condensate and ammonia vapors then pass to one or the other of collectors 94 and 96. Ammonia vapors are withdrawn from collectors 94 and 96 by a vacuum pump 98 and passed to a drying tower 100 filled with lime or other suitable dehydrating agent. The resulting dried ammonia gas may be passed to a condenser, such as 66 of Fig. 1, and returned to the cycle or may be otherwise recovered and used. The condensate from condenser 93 is allowed to accumulate until one collector 94 or 96 is full and then the condensate is passed to the other collector. The condensate constitutes a weak ammonia liquor. It may be heated by steam coils 101 and 102 to distill off ammonia vapors which are withdrawn by the vacuum pump 98. Distillation of the liquid in the collectors 94 and 96 may be employed to produce steam which is passed through pipe 103 connected with inlet 89 in extractor 2 to effect the removal of ammonia from the purified anthracene.

Instead of using steam for removing ammonia remaining in contact with the purified anthracene in the extractor and for separating ammonia from impurities in the receptacles 32 and 34, I may blow air or other inert gas through the anthracene and pass the resulting mixture of gases to a chamber containing water, sulfuric acid or other solvent for the ammonia. When the ammonia is absorbed in water the ammoniacal liquor obtained may be passed to collectors 94 and 96 to be treated as heretofore described.

In one example of practicing this invention, a twenty-five pound charge of a crude anthracene fraction from the distillation of coal tar, containing approximately 35.5 per cent anthracene, was intermittently immersed in liquid ammonia and the ammonia drained therefrom. These cycles were repeated thirteen times. A relatively pure anthracene containing 80.3 per cent of anthracene was obtained. In another example of this invention, a 40 pound charge of crude anthracene containing approximately 37.5 per cent anthracene was given thirty-six washes with liquid ammonia and a relatively pure anthracene containing 81 per cent anthracene was thus obtained.

Since the "free carbon" content of the crude is not removed by the ammonia wash treatment, in order to obtain a highly purified anthracene, it is important to start with a crude low in "free carbon", preferably containing less than 0.5 per cent of "free carbon". For example, a crude containing 25 per cent anthracene and 1 per cent "free carbon", upon purification of the crude to 85 per cent anthracene will contain 3.4 per cent "free carbon"; a crude containing 3 per cent of "free carbon" will contain 10.2 per cent in the purified product containing 85 per cent anthracene. The term "free carbon" is used in the sense common in the coal tar industry to indicate material contained in the bituminous compound which is insoluble in benzol or carbon bisulfide. It is commonly determined as described by Weiss (Journal of Industrial and Engineering Chemistry, vol. 10, 1918, pages 736 and 820, Test D5). It comprises high-molecular weight carbon compounds of low solubility, carbon, and other insoluble material.

Although I have described my invention throughout with reference to the use of liquid, substantially anhydrous, ammonia as a solvent for impurities in the crude anthracene, I may employ sulfur dioxide or other normally gaseous substance in liquid form as a solvent and I may also employ aqua ammonia containing 75 per cent or more of ammonia. The term "liquid ammonia" as used throughout the claims is intended to include both liquid anhydrous ammonia and aqua ammonia containing 75 per cent or more of ammonia in solution. When using sulfur dioxide or aqua ammonia, the pressure on the system may be somewhat less than that required when using anhydrous ammonia and when using aqua ammonia the extraction of impurities is not so rapid and therefore the length of time of operation will ordinarily be prolonged. When strong aqua ammonia is used, a certain amount of fractionation may take place, resulting in a deposition of water in the receivers. This water may be withdrawn with the impurities when emptying the receivers.

It will also be understood that the apparatus herein shown and described may be modified or other apparatus employed in carrying out the process without departing from my invention.

I claim:

1. The process of producing purified anthracene products containing in excess of 80% anthracene by removing impurities from the anthracene by extracting the same with liquid ammonia, which comprises introducing crude anthracene material containing not more than about 40% anthracene and not more than about .5% free carbon into an extraction zone, introducing successive charges of liquid ammonia into contact with said crude anthracene while maintaining a pressure in the extraction zone sufficient to maintain the ammonia in the liquid phase, removing the major portion of each charge of liquid ammonia thus introduced together with dissolved impurities from the anthracene under treatment before contacting the anthracene with the next charge of liquid ammonia, repeating the successive contacts of said anthracene with liquid ammonia until the material in the extraction zone contains at least 80% anthracene on an ammonia free basis, adding to the liquid ammonia containing impurities removed from the anthracene a solvent for the impurities which solvent is substantially nonvolatile under the conditions under which distillation of the liquid ammonia containing impurities takes place, distilling the liquid ammonia solvent mixture to drive off the ammonia in vapor form and condensing and re-using the ammonia thus driven off.

2. The process as defined in claim 1 in which the anthracene material under treatment is agitated during the extraction thereof with liquid ammonia.

3. The process as defined in claim 1 in which the extraction zone is evacuated after introduction of crude anthracene and residual ammonia remaining in the purified anthracene is removed in gaseous form, condensed and re-used.

4. The method of purifying crude anthracene containing phenanthrene and carbazol, which comprises extracting the anthracene with liquid ammonia under pressure, withdrawing the liquid anhydrous ammonia and dissolved impurities from the anthracene and separately collecting the liquid ammonia initially contacted with the anthracene which is rich in phenanthrene and the residual ammonia contacted with the anthracene which is rich in carbazol, separately recovering the phenanthrene and carbazol from the respective fractions containing the same, and removing residual ammonia from the purified anthracene.

5. The method of treating crude anthracene to separate impurities therefrom by the selective solvent action of liquid anhydrous ammonia contacted with anthracene in a closed system and under pressure which comprises evacuating the system to remove air therefrom, thereafter continuously circulating liquid ammonia under pressure in contact with the crude anthracene until soluble impurities therein have been removed to the desired extent, continuously separating liquid ammonia containing dissolved impurities from the anthracene, separately collecting that portion of the ammonia first withdrawn from the anthracene, distilling off ammonia from the impurities dissolved therein while collecting that portion of the liquid ammonia thereafter withdrawn from the anthracene, condensing the ammonia gas produced and returning the resulting liquid ammonia to the cycle, heating the anthracene after purification thereof and after the liquid ammonia has been withdrawn therefrom to distill off ammonia remaining therein, and recovering the ammonia gas thus produced.

STUART P. MILLER.